(12) United States Patent  
Casper

(10) Patent No.: US 7,618,073 B2
(45) Date of Patent: Nov. 17, 2009

(54) WASTE COLLECTION TOOL

(76) Inventor: Robert W. Casper, 194 Sasco River La., Southport, CT (US) 06890

( * ) Notice: Subject to any disclaimer, the term of this patent is extended or adjusted under 35 U.S.C. 154(b) by 163 days.

(21) Appl. No.: 11/876,310

(22) Filed: Oct. 22, 2007

(65) Prior Publication Data
US 2009/0102212 A1  Apr. 23, 2009

(51) Int. Cl.
A01K 29/00 (2006.01)
E01H 1/12 (2006.01)

(52) U.S. Cl. ........................................ 294/1.4; 248/101

(58) Field of Classification Search ................. 294/1.1, 294/1.3, 1.4, 1.5, 55; 248/99–101; 15/257.1, 15/257.3, 257.9
See application file for complete search history.

(56) References Cited

U.S. PATENT DOCUMENTS

| 569,830 | A | 10/1896 | Hunt | 15/257.9 |
| 3,659,891 | A | 5/1972 | Pettenon et al. | 294/19 |
| 3,711,141 | A | 1/1973 | Soergel | 294/55 |
| 3,872,834 | A | 3/1975 | Fuhrman | 119/151 |
| 4,012,067 | A | 3/1977 | Travis | 294/19 |
| 4,048,691 | A | 9/1977 | Spangler | 15/257.1 |
| 4,146,259 | A | 3/1979 | Schultz | 294/19 |
| 4,269,441 | A | 5/1981 | Hirsch | 294/1 |
| D267,593 | S | 1/1983 | Crawford et al. | D34/1 |
| 4,705,310 | A * | 11/1987 | Scripter | 294/1.4 |
| 4,787,753 | A | 11/1988 | Barnhart | 383/33 |
| 4,958,871 | A | 9/1990 | Hemans | 294/1.4 |
| 5,050,920 | A | 9/1991 | Potticary | 294/55 |
| 5,718,469 | A | 2/1998 | Ockerman | 294/1.4 |
| 5,971,452 | A | 10/1999 | Marymor et al. | 294/1.5 |
| 6,485,073 | B2 * | 11/2002 | Harrison | 294/1.4 |
| 6,648,387 | B2 * | 11/2003 | Kaplan | 294/1.5 |
| 7,188,878 | B1 | 3/2007 | Kraus | 294/1.4 |
| 2003/0085581 | A1 | 5/2003 | Jemison | 294/1.4 |
| 2009/0072559 | A1* | 3/2009 | Wilkerson | 294/1.4 |

* cited by examiner

Primary Examiner—Dean J Kramer
(74) Attorney, Agent, or Firm—St. Onge Steward Johnston & Reens LLC

(57) ABSTRACT

A tool for collecting waste in a bag, comprising an elongated shaft member, a ring member, and two clamps. The tool provides for the securing of a bag on the ring member such that no part of the ring member or the outside surface of the bag may come in contact with the waste to be collected. The tool utilizes an arcuate ring member and there is substantially no angle between the ring member and the elongated shaft member.

22 Claims, 5 Drawing Sheets

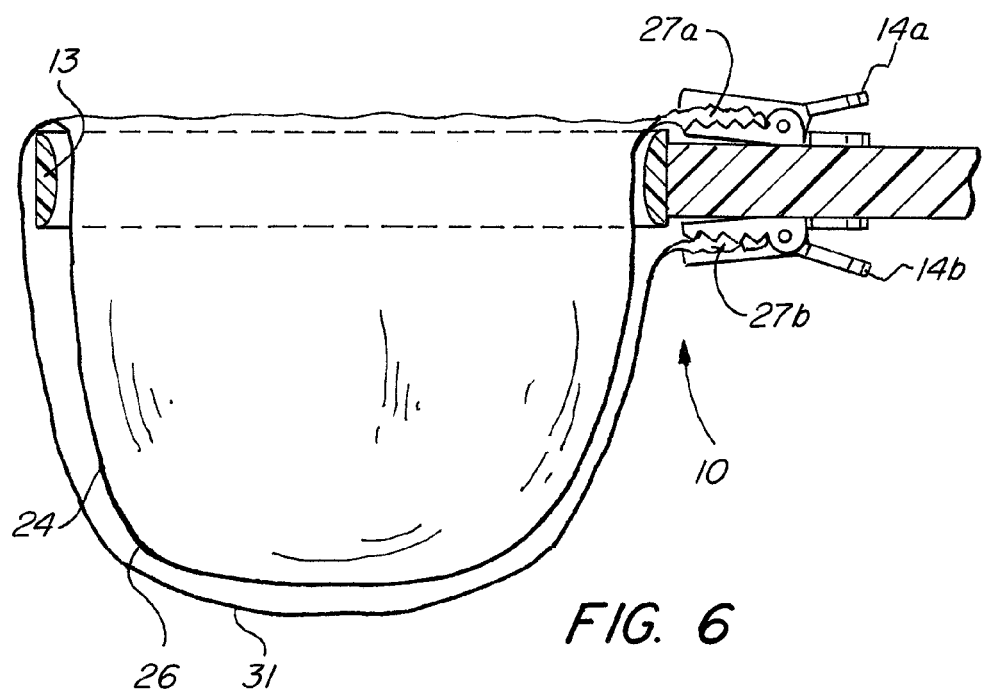

WASTE COLLECTION TOOL

FIELD OF THE INVENTION

The present invention relates to a device or tool for collecting waste. More particularly, the present invention relates to a device or tool for collecting waste from the floor or ground in a clean, hygienic, and convenient manner.

BACKGROUND OF THE INVENTION

As is well known, waste of various types must be collected and removed from public areas such as parks, city streets and sidewalks, town squares, outdoor shopping centers, and the like. Private property owners also strive to maintain their property in a neat and clean condition. Articles such as litter and pet waste must be collected and removed in order for the area to remain attractive for people to visit and use.

In particular, pet waste poses significant problems if it is not collected and removed promptly. Pet waste creates unpleasant odors and can damage landscaping and flora. Pet waste also has been known to carry disease and to promote the activities of disease-carrying insects and the like. For these reasons, many cities and municipalities have enacted ordinances that require pet owners to collect and remove their pet's waste immediately after the waste is deposited on the ground.

In light of these well-known circumstances, many devices have been designed to aid people who must collect and remove waste from the floor or ground. It is obviously not safe or hygienic for a person to handle most waste directly, so many of these devices attempt to allow the person who is collecting the waste to avoid having to actually touch the waste. Most of the devices known in the prior art also attempt to provide for easy disposal of the waste after it is collected from the ground. Generally, the devices are designed such that the waste is collected directly into a plastic bag, which can then be placed in an appropriate waste receptacle.

For example, U.S. Pat. No. 4,012,067 to Travis and U.S. Pat. No. 4,705,310 to Scripter disclose waste collection devices comprising elongated handles with a frame or bag support member attached at one end. The frame members hold a bag and a single clip is provided to secure the bag on the frame member. The devices are employed by a person holding the handle and then using a scooping motion so that the frame member with a bag attached thereto receives the waste in the bag.

Unfortunately, these devices suffer from significant drawbacks. For example, each provides that the bag is wrapped around the frame member such that it substantially surrounds the bag member, however, the single clip is inadequate to retain the bag in this position during and after waste collection. Vigorous scooping and/or heavy articles of waste could cause the bag to become unwrapped from the frame member such that the bag falls through the frame. The bag may remain clipped by the single clip, but it will not be in the proper position for additional collections. In such a situation, multiple articles of waste could not be collected without utilizing multiple bags or by repeatedly rewrapping the bag around the frame. Further, the frame members that hold the bag shown for each device have a relatively straight section for contacting the ground during waste collection. Such a design feature severely limits the angles at which the device may be effectively used for waste collection.

Finally, due to the design of these devices, there is a substantial likelihood that the outer surface of the bag would come into contact with the waste being collected. Because it is the outer surface that would be directly handled by the person collecting waste after waste collection, this creates a unhygienic situation and at least partially defeats the purpose of using such a device for waste collection.

U.S. Pat. No. 7,188,878 to Kraus also discloses a waste collection device having an elongated handle, a bag frame member, and a clamp. In this device, however, the bag frame member consists of a tubular member that is configured to act as a "scoop blade." The bag frame member holds a bag, preferably a plastic grocery bag, with part of the open end of the bag wrapped around the outside of the bag frame member.

This device also has significant drawbacks. First, the size and heft of the tubular member—which is located at the end of a long handle—makes the device difficult to use. A pet owner, for example, is most likely to be using the device while walking his or her pet on a leash. He or she will not be able to use both hands to operate the device while still controlling his or her pet. Second, the bag does not wrap completely around its closed end. This creates the strong probability that waste will contact the outside of the bag during collection, which, again, significantly reduces the hygienic benefits of using the device instead of directly handling the waste.

U.S. Pat. Appl. Publ. No. 2003/0085581 of Jemison discloses another similar device for collecting and disposing of waste. The device includes an elongated handle and a trapezoidal loop on which a bag is secured. The loop is attached to the elongated handle at an oblique angle. The device of the Jemison application also includes a second clip for clipping the excess material around the mouth of the bag. In such a configuration, the bag will substantially surround the loop for holding the bag and a portion of the handle.

As with the device disclosed in the '878 patent to Kraus, the device of the Jemison application also does not provide for adequate coverage of the outside of the bag so as to protect it from contact with the waste being collected. Further, the trapezoidal loop has a knife edge or serrated edge, which is likely to damage the bag and cause it to fail. Also, the trapezoidal loop as well as the angle between the handle and the loop severely limit the angles at which the device may be oriented with respect to the ground for effective scooping of the waste. The design of the Jemison device is such that a "raking" motion must be used to collect waste. In other words, a user of the device must drag the trapezoidal loop along the ground in a direction towards him or her in order to collect waste. The design of the device does not allow for much, if any, flexibility in the use of the device. These aspects of the design make the device less convenient to use.

In summary, the devices of the prior art do not adequately protect a person from coming into contact with waste to be collected. These devices leave a large amount of the outside of the bag exposed and susceptible to contact with the waste. This contravenes one of the main purposes of using a device to collect waste: preventing unhygienic contact with the waste. The devices of the prior art also limit the ease of use by restricting the angle with respect to the ground at which the device can be effectively used.

What is needed, therefore, is a device or tool for collecting waste that will minimize the possibility of a person coming into contact with waste that is being collected. The device should also be simple in construction and easy and convenient to use. The device should allow a person to make multiple waste collections using a single bag without having to re-situate the bag after each collection.

SUMMARY OF THE INVENTION

It is an object of the present invention to provide a device or tool for collecting waste that will minimize the possibility of a person coming into contact with waste that is being collected.

It is another object of the present invention to provide device that is simple in construction and easy and convenient to use.

It is yet a further object of the present invention to provide a device that allows a person to make multiple waste collections using a single bag without having to re-situate the bag after each collection.

These and other objects are achieved by a first exemplary embodiment of the present invention, wherein a tool for collecting waste in a bag is provided, comprising: an elongated shaft member comprising a first end and a second end; a ring member attached to the first end of the elongated shaft member, the ring member having an end portion opposite the first end of the elongated shaft member, the end portion having an arcuate shape; and two clamps attached to the elongated shaft member adjacent to its first end and to the ring member. The clamps secure a bag, which has an open end and a closed end, near an edge of the bag that is located adjacent to the open end such that the bag is secured by the clamps on substantially opposite portions of the edge. When the bag is secured by the clamps, a portion of the bag wraps around the closed end to substantially surround an outer surface of the bag and the ring member so that waste is prevented from contacting the ring and the outer surface of the bag during waste collection.

In some embodiments, the ring member comprises an inner surface and said inner surface is rounded. In some embodiments, the arcuate shape of the end portion spans an arc of at least 90°. In some embodiments, the ring member is circular. In some embodiments, the elongated shaft member further comprises a single axis and the ring member is attached to the elongated shaft member such that the axis of the shaft member lies substantially within a plane associated with an aperture of the ring member. In some embodiments, the elongated shaft member is comprised of two detachably connected sections. In some embodiments, the tool further comprises a handle member attached on the second end of the elongated shaft member. In some embodiments, the handle member has a substantially rectangular cross-section and is attached to the elongated shaft member, which also has a substantially rectangular cross-section, such that the handle member is rotationally offset with respect to the elongated shaft member.

According to a second embodiment of the present invention, a tool for collecting waste in a bag, comprising: an elongated shaft member comprising a first end and a second end; a ring member attached to the first end of the elongated shaft member, comprising an inner surface and having an end portion opposite the first end of the elongated shaft member, the end portion having an arcuate shape; and two clamps attached to the elongated shaft member adjacent to its first end and to the ring member. The inner surface of the ring member is rounded. The clamps secure a bag comprising an open end and a closed end such that a portion of the bag wraps around the closed end to substantially surround an outer surface of the bag and the ring member so that waste is prevented from contacting the ring and the outer surface of the bag during waste collection.

In some embodiments, the clamps secure the bag near an edge of the bag that is located adjacent to the open end such that the bag is secured by the clamps on substantially opposite portions of the edge. In some embodiments, the arcuate shape of the end portion spans an arc of at least 90°. In some embodiments, the ring member is circular. In some embodiments, a handle member is attached on the second end of the elongated shaft member. In some embodiments, the elongated shaft member is comprised of two detachably connected sections. In some embodiments, the handle member has a substantially rectangular cross-section and is attached to the elongated shaft member, which also has a substantially rectangular cross-section, such that the handle member is rotationally offset with respect to the elongated shaft member. In some embodiments, the elongated shaft member further comprises a single axis and the ring member is attached to the elongated shaft member such that the axis of the shaft member lies substantially within a plane associated with an aperture of the ring member.

According to a third embodiment of the present invention, a tool for collecting waste in a bag is provided, comprising: an elongated shaft member comprising a first end, a second end, and a single axis; a circular ring member attached to the first end of the elongated shaft member, comprising an aperture and an inner surface on an inner diameter of the circular ring member; and two clamps attached to the elongated shaft member adjacent to its first end and to the circular ring member. The circular ring member is attached to the elongated shaft member such that the axis of the elongated shaft member lies substantially within a plane associated with the aperture of the circular ring member. The inner surface of the circular ring member is rounded. The clamps secure a bag comprising an open end and a closed end near an edge of the bag that is located adjacent to the open end such that the bag is secured by the clamps on substantially opposite portions of the edge. When the bag is secured by the clamps, a portion of the bag wraps around the closed end to substantially surround an outer surface of the bag and the ring member so that waste is prevented from contacting the ring and the outer surface of the bag during waste collection.

In some embodiments, the clamps are attached to the elongated shaft member adjacent to its first end and on opposite sides of the elongated shaft member. In some embodiments, the clamps are alligator clips. In some embodiments, the elongated shaft member is comprised of two detachably connected sections. In some embodiments, a handle member is attached on the second end of the elongated shaft member. In some embodiments, the handle member has a substantially rectangular cross-section and is attached to the elongated shaft member, which also has a substantially rectangular cross-section, such that the handle member is rotationally offset with respect to the elongated shaft member.

The invention and its particular features and advantages will become more apparent from the following detailed description considered with reference to the accompanying drawings.

BRIEF DESCRIPTION OF THE DRAWINGS

FIG. 6 is cross-section view of the tool for collecting waste in a bag shown in FIG. 1.

DETAILED DESCRIPTION OF THE DRAWINGS

Figure 1:
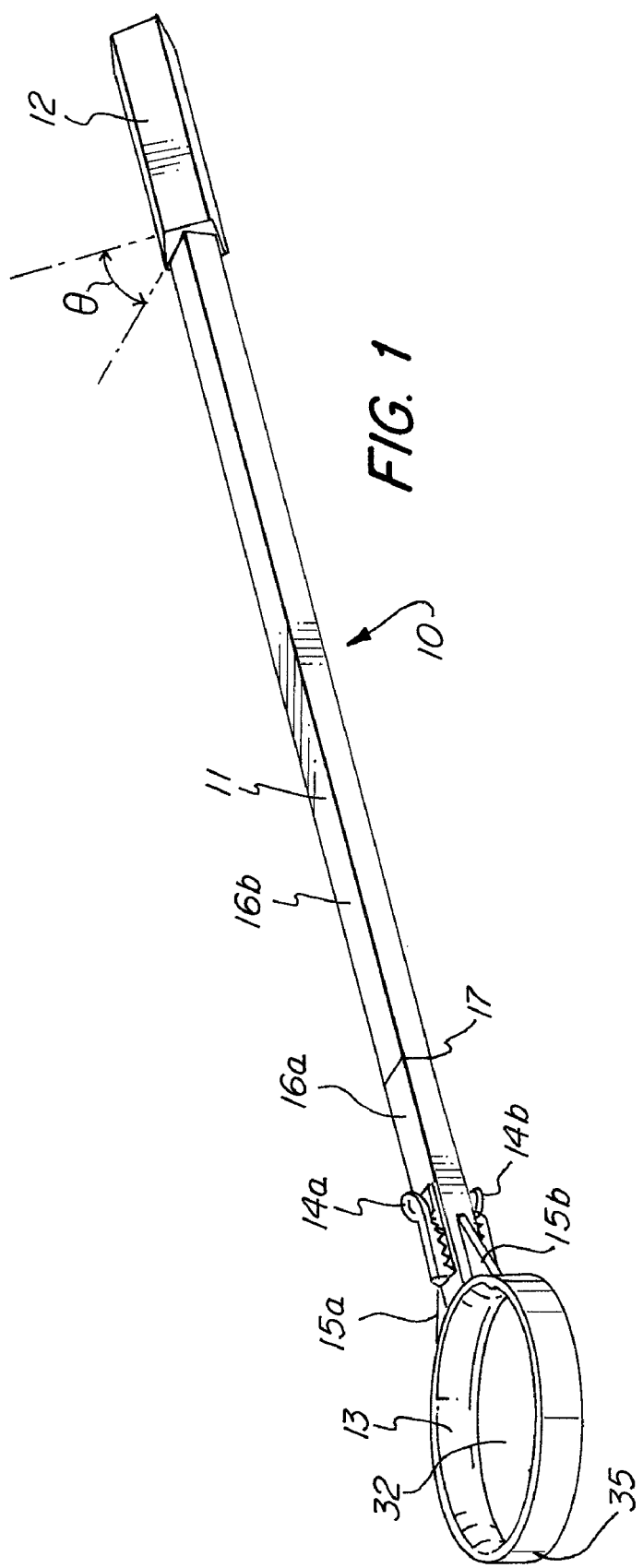
FIG. 1 is a perspective view of a tool for collecting waste in a bag according to one embodiment of the present invention.

Embodiments of the present invention will now be described with reference to the drawings shown in FIGS. 1-6. FIG. 1 shows a tool 10 for collecting waste. The tool 10 has an elongated shaft member 11, a handle member 12, a ring member 13, and two clamps 14a and 14b. The components of tools according to the present invention are formed of suitable materials to provide appropriate stiffness and resiliency. For example, metals, plastics, woods, and various composites are used in various embodiments. The shaft member 11 and the ring member 13 may have a small amount of flexibility but should be substantially stiff and strong. The handle member 12 is constructed from materials that are comfortable to grip and that help prevent grip-slippage.

In the embodiment shown in FIG. 1, both the shaft member 11 and the handle 12 have rectangular cross-sections. In other embodiments, however, these parts have different cross-sectional shapes, such as circular, rectangular with rounded corners, and the like. The handle member 12 is also ergonomically shaped in some embodiments to increase the comfort and gripping ability of a user of the tool 10.

The handle 12 in the embodiment shown in FIG. 1 is rectangular and is rotated with respect to the shaft member 11. The handle 12 is rotationally offset at an angle θ. In the embodiment shown, θ is 45°. The purpose of this arrangement is so that the handle portion provides the most comfortable grip for the user when the tool 10 is most advantageously oriented for scooping waste. That is, when a user of the tool 10 grips the rectangular handle 12, his or her grip will be most comfortable when the tool is oriented such that the ring member 13 approaches the ground at an advantageous angle for scooping. This aspect improves the convenience of using the tool 10.

FIG. 1 also shows support members 15a and 15b which are part of the connection between the shaft member 11 and the ring member 13. The support members 15a and 15b help to prevent flex between the ring member 13 and the shaft member 11 so that their relative positions are maintained. It is important to note that according to the present invention, there is substantially no angle between the ring member 13 and the shaft member 11. The ring member 13 has an aperture 32. The axis of the shaft member 11 is ideally oriented so that it is within the plane associated with aperture 32. It is advantageous to restrict, as much as possible, the angle between the axis of the shaft member 11 and the plane of the aperture 32 to 0° or, at most, less than 10° in any direction.

Embodiments of the present invention provide that the ring member 13 has an end portion 35 that is arcuate in shape. That is, the portion of the ring member that comes into contact with the ground has an arcuate shape. The end portion 35 is the portion of the ring member 13 that is opposite the end of the shaft member 11 that is attached to the ring member 13. In preferred embodiments of the invention, the ring member 13 is completely circular. The arcuate shape of at least the end portion 35 of the ring member is a feature of the present invention that allows for a great deal of flexibility in use of the tool 10 for waste collection. Since at least the end portion 35 of the ring member 13 is arcuate or the ring member 13 is completely circular, the tool can be effectively used to scoop and collect waste in many orientations having substantially any angle within the plane associated with aperture 32 with respect to the ground. In some preferred embodiments, the end portion 35 comprises an arc that spans at least 90°. It will be apparent to one of ordinary skill in the art that the span of the arcuate end portion 35 can vary between 90° and 360°. In embodiments in which the arcuate end portion 35 spans 360°, of course, the ring member 13 is completely circular as shown in the figures.

In the embodiment shown in FIG. 1, the shaft member 11 includes the feature that it has two sections—a first section 16a and a second section 16b. The sections 16a and 16b come together at joint 17. The connection of sections 16a and 16b of shaft member 11 is shown in more detail in FIG. 2, which is a plan view of the end of tool 10 on which the ring member 13 is attached. Second section 16b has a threaded rod 18 installed in its end, which is designed to engage with a recess 19 in an end of first section 16a. Recess 19 has a threaded surface that corresponds to the threads of rod 18. In other embodiments, the shaft member 11 has different configurations. For example, shaft member 11 includes telescoping sections in some embodiments, which allows the user of tool 10 to have a great deal of control over the length of the shaft member 11.

The sectional nature of the elongated shaft member 11 makes the tool 10 more versatile. The tool 10 can be used either with second section 16b attached to first section 16a or without. The second section 16b allows the user of the tool 10 to avoid bending over or reaching to collect waste and makes use of the tool 10 more convenient for many users. The connection between the shaft members, while shown as employing a threaded rod 18 and corresponding recess 19 in the embodiment shown in FIG. 2, has various designs in various other embodiments. For example, projections formed on the second section 16b and corresponding slots on the first section 16a are used in some embodiments. Various types of retention clips are used in other embodiments.

Figure 2:
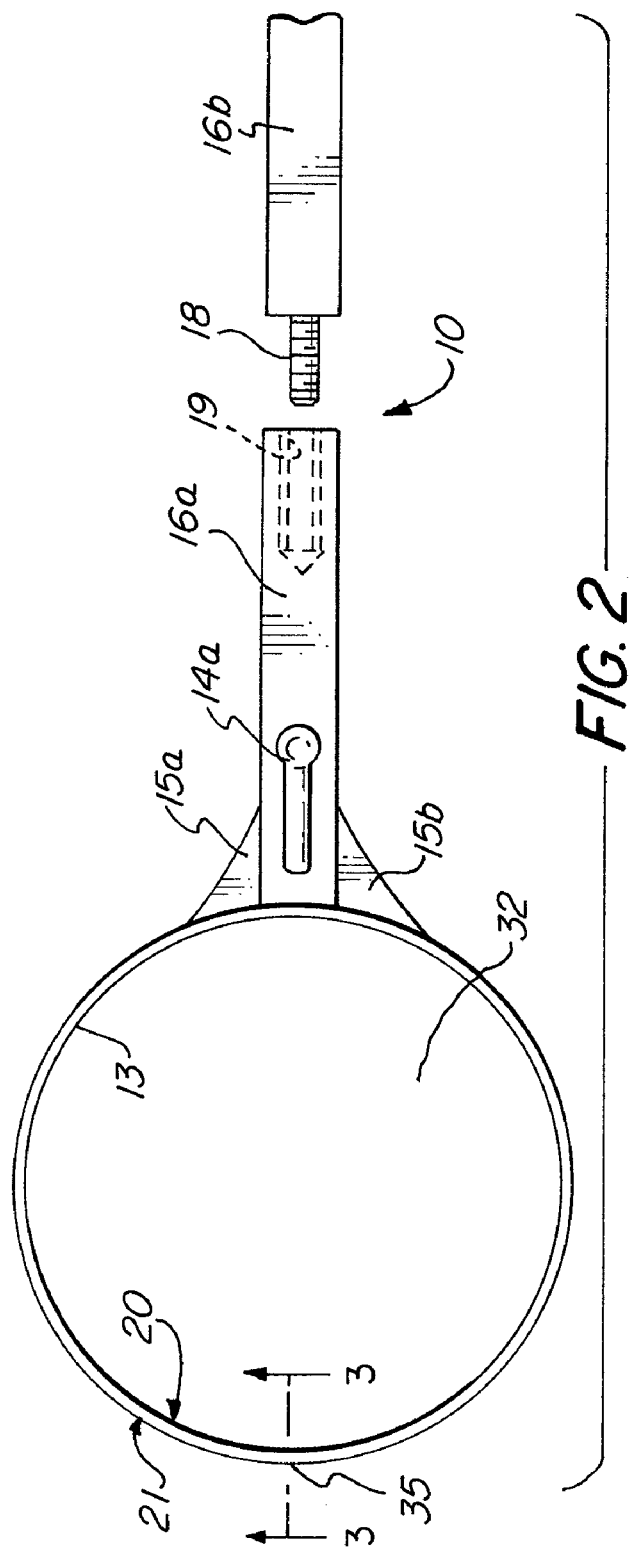
FIG. 2 is a plan view of the tool for collecting waste in a bag shown in FIG. 1.
Figure 3:
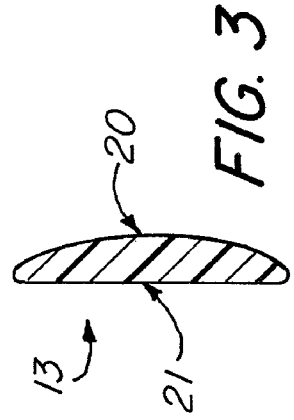
FIG. 3 is a cross-section view of a portion of the tool for collecting waste in a bag shown in FIG. 1.

FIG. 3 shows a cross-sectional view of the ring member 13. As shown in FIGS. 2 and 3, the ring member 13 has an inner surface 20 and an outer surface 21. In the embodiment shown, the inner surface 20 is rounded. This feature aids in waste collection, as will be described in more detail below. The outer surface 21 is shown as flat in the figures, but is rounded in other embodiments to further aid in waste collection.

Figure 4:
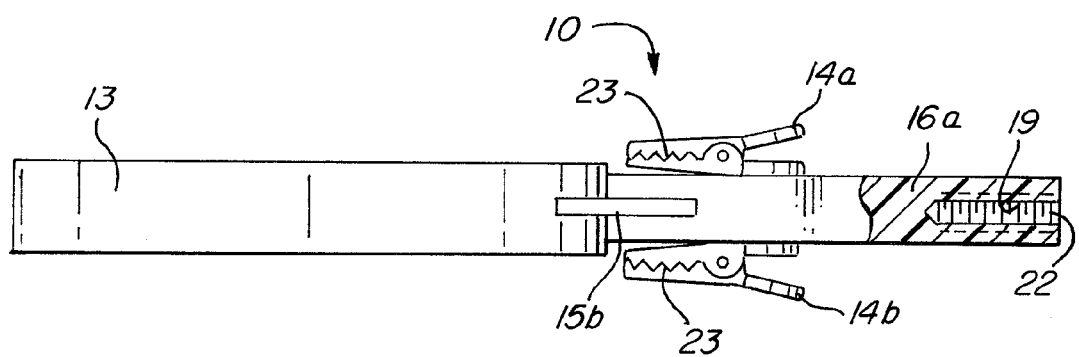
FIG. 4 is a side view of the tool for collecting waste in a bag shown in FIG. 1.

FIG. 4 shows a side view of the waste collection tool 10, with a portion of the first section 16a of the shaft member 11 cut away to show the recess 19 and its threaded surface 22. The two clamps 14a and 14b are also shown in greater detail. In the embodiment shown, clamps 14a and 14b are alligator style clamps having teeth 23 for gripping a bag. Of course, other types of clamps or clips are used in other embodiments.

Figure 5A:
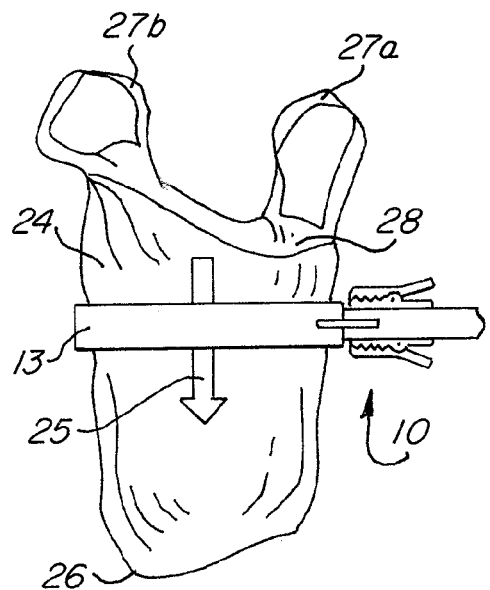
FIG. 5A is a side view of the tool for collecting waste in a bag shown in FIG. 1 with a bag positioned within the ring member.

The manner in which a bag is attached to the tool 10 for waste collection will now be described with reference to FIGS. 5A-5D. FIG. 5A shows a bag 24 being positioned in the ring member 13. The bag 24, in the embodiment shown, is a standard plastic shopping bag, but many types of bags are capable of effective use with the present invention. The bag 24 has a closed end 26, an open end 28, a first handle 27a, and a second handle 27b. The handles 27a and 27b are located on the edge adjacent to the open end 28 on opposite sides of the edge. The bag 24 is moved in the direction of arrow 25 so that it is within the ring member 13 and about half of the bag 24 projects below the ring member 13 and the other half projects above the ring member 13.

Figure 5B:
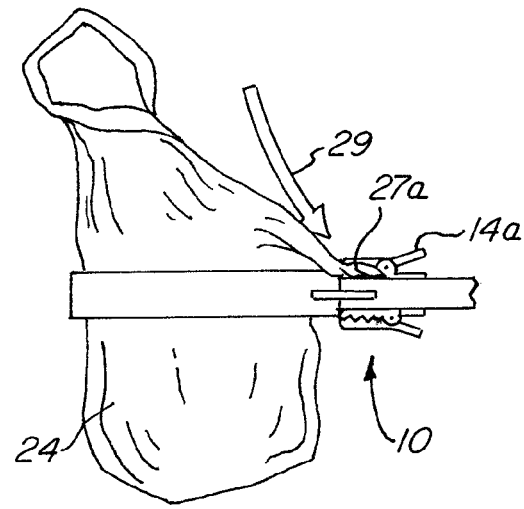
FIG. 5B is a side view of the tool for collecting waste in a bag shown in FIG. 1 with a portion of a bag clamped in a first clamp.
Figure 5C:
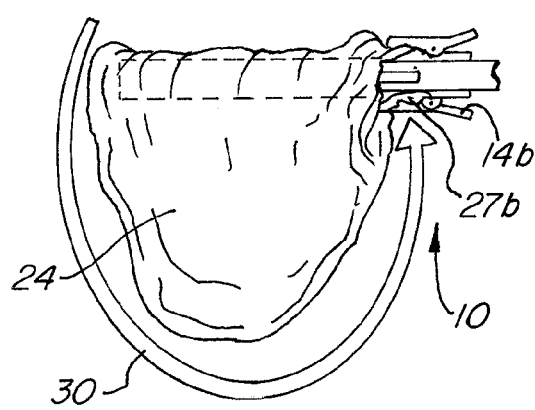
FIG. 5C is a side view of the tool for collecting waste in a bag shown in FIG. 1 with the bag wrapped around its closed end.
Figure 5D:
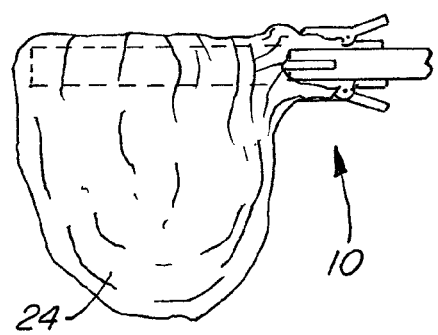
FIG. 5D is a side view of the tool for collecting waste in a bag shown in FIG. 1 with the bag wrapped around its closed end and clamped in the second clamp.

Next, as shown in FIG. 5B, the first handle 27a is moved in the direction of arrow 29 and secured by clamp 14a. Then, as shown in FIG. 5C, the second handle 27b is moved in the direction of arrow 30 so that a top portion of the bag 24 is wrapped around the closed end 26 of the bag 24. Second handle 27b is secured by clamp 14b. This forms a double-layer pocket of the bag 24, as shown in FIG. 5D. The bag 24 is now situated so that top half has been wrapped substantially around the ring member 13 and the closed end 26 of the bag 24. FIG. 6 shows this arrangement in a cross-sectional view. The closed end 26 of the bag 24 is completely covered by the portion 31 that is wrapped around to clamp 27b. This forms a double layer pocket and protects both the ring member 13 and the outside surface of the bag 24 from touching waste while it is being collected.

It will be understood by those of skill in the art that a bag without handles can also be used with the present invention. In such a situation, the bag without handles will also have an edge adjacent to its open end. Such a bag is secured by simply clamping a portion of the edge in one clamp, wrapping the bag around its closed end as described above, and then clamping a portion of the edge on the opposite side of the edge with the other clamp. The tool 10 is useful with bags of many shapes and sizes.

Once the bag 24 is positioned properly, the tool 10 is used to scoop up waste such that the waste is deposited in the bag 24. When the shaft member 11 includes both the first and second sections 16a and 16b, the user of the tool 10 can scoop waste generally from a standing position. Without second section 16b, the user must bend or crouch to scoop the waste. In either case, the scooping motion will be the same. The ring member 13 is brought near the waste and in contact with the ground. The ring member 13 is then slid along the ground in the direction of the waste with a slight twisting motion so that the waste is scooped into the bag 24.

After the waste to be collected has been scooped into the bag, removal of the bag from the ring member 13 is very simple. The user, while holding the tool such that the ring member 13 is horizontal, releases the clamp 14b (on the bottom of the tool) so that the bag is pulled slightly through the ring member under the weight of the waste. This motion will at least partially unwrap the double-layer pocket. The user then releases clamp 14a (on the top of the tool) so that the bag is no longer secured and falls the rest of the way through the ring member 13. The bag could then fall directly into a receptacle, onto the ground, or into the hand of the user. Even if the bag falls into the hand of the user, no unsanitary condition is created because the outside of the bag has been protected from any contact with the waste by the double-layer pocket.

As noted above, various aspects of the embodiments shown in the figures enhance the ease with which waste is scooped into the bag. First, the shape of the cross-section of the ring member 13 makes scooping of waste easier. The rounded inner surface 20 provides a lower profile edge that lifts the waste easier than if the cross section of the ring member 13 was rectangular. Second, at least the end portion 35 of the ring member 13 has an arcuate shape (spanning at least 90°; the ring member 13 of the embodiment shown in the figures is completely circular), which means that the tool 10 can be oriented at any angle within the plane associated with aperture 32 with respect to the ground when it is employed in waste collection. In some embodiments, the handle portion 12 is rotationally offset so that the user's natural grip of the tool is such that the ring member 13 is oriented advantageously for scooping waste.

Further, the ring member 13 is not attached to the shaft member 11 at an angle. That is, the axis of the shaft member 11 lies within the plane associated with the aperture 32 of the ring member 13. These aspects allow for a convenient scooping motion as opposed to the "raking" motion required with devices of the prior art, such as Jemison. This makes the tool 10 far more convenient than tool designs that are effective only when oriented at a single, certain angle with respect to the ground.

It will be apparent to one of ordinary skill in the art that a wide variety of other features are employed in embodiments of the invention without departure from the spirit of the invention. For example, some embodiments include a lighting device to better enable use of the tool 10 in conditions with poor visibility. Some embodiments include a device for conveniently storing bags to be used with the tool.

Thus, embodiments of the present invention provide convenient, hygienic, and sanitary means for disposing of waste that is deposited on the ground. The present invention provides waste collectors with protection from any contact with the waste being collected. The tool is advantageously used for a single waste collection or for multiple collections using the same bag without having to re-situate the bag between collections.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A tool for collecting waste in a bag, comprising:
   an elongated shaft member comprising a first end and a second end;
   a ring member attached to the first end of the elongated shaft member, the ring member having an end portion opposite the first end of the elongated shaft member, the end portion having an arcuate shape;
   two clamps attached to the elongated shaft member adjacent to its first end and to the ring member;
   wherein the clamps secure a bag comprising an open end and a closed end near an edge of the bag that is located adjacent to the open end such that the bag is secured by the clamps on substantially opposite portions of the edge; and
   wherein, when the bag is secured by the clamps, a portion of the bag wraps around the closed end to substantially surround an outer surface of the bag and the ring member so that waste is prevented from contacting the ring and the outer surface of the bag during waste collection.

2. The tool of claim 1, wherein the ring member comprises an inner surface and said inner surface is rounded.

3. The tool of claim 1, wherein the arcuate shape of the end portion spans an arc of at least 90°.

4. The tool of claim 1, wherein the ring member is circular.

5. The tool of claim 1, wherein the elongated shaft member further comprises a single axis and the ring member is attached to the elongated shaft member such that the axis of the shaft member lies substantially within a plane associated with an aperture of the ring member.

6. The tool of claim 1, wherein the elongated shaft member is comprised of two detachably connected sections.

7. The tool of claim 1, further comprising a handle member attached on the second end of the elongated shaft member.

8. The tool of claim 7, wherein the handle member has a substantially rectangular cross-section and is attached to the elongated shaft member, which also has a substantially rectangular cross-section, such that the handle member is rotationally offset with respect to the elongated shaft member.

9. A tool for collecting waste in a bag, comprising:
an elongated shaft member comprising a first end and a second end;
a ring member attached to the first end of the elongated shaft member, comprising an inner surface and having an end portion opposite the first end of the elongated shaft member, the end portion having an arcuate shape;
two clamps attached to the elongated shaft member adjacent to its first end and to the ring member;
wherein the inner surface of the ring member is rounded; and
wherein, the clamps secure a bag comprising an open end and a closed end such that a portion of the bag wraps around the closed end to substantially surround an outer surface of the bag and the ring member so that waste is prevented from contacting the ring and the outer surface of the bag during waste collection.

10. The tool of claim 9, wherein the clamps secure the bag near an edge of the bag that is located adjacent to the open end such that the bag is secured by the clamps on substantially opposite portions of the edge.

11. The tool of claim 9, wherein the arcuate shape of the end portion spans an arc of at least 90°.

12. The tool of claim 9, wherein the ring member is circular.

13. The tool of claim 9, wherein the elongated shaft member is comprised of two detachably connected sections.

14. The tool of claim 9, further comprising a handle member attached on the second end of the elongated shaft member.

15. The tool of claim 14, wherein the handle member has a substantially rectangular cross-section and is attached to the elongated shaft member, which also has a substantially rectangular cross-section, such that the handle member is rotationally offset with respect to the elongated shaft member.

16. The tool of claim 9, wherein the elongated shaft member further comprises a single axis and the ring member is attached to the elongated shaft member such that the axis of the shaft member lies substantially within a plane associated with an aperture of the ring member.

17. A tool for collecting waste in a bag, comprising:
an elongated shaft member comprising a first end, a second end, and a single axis;
a circular ring member attached to the first end of the elongated shaft member, comprising an aperture and an inner surface on an inner diameter of the circular ring member;
two clamps attached to the elongated shaft member adjacent to its first end and to the circular ring member;
wherein the circular ring member is attached to the elongated shaft member such that the axis of the elongated shaft member lies substantially within a plane associated with the aperture of the circular ring member;
wherein the inner surface of the circular ring member is rounded;
wherein the clamps secure a bag comprising an open end and a closed end near an edge of the bag that is located adjacent to the open end such that the bag is secured by the clamps on substantially opposite portions of the edge; and
wherein, when the bag is secured by the clamps, a portion of the bag wraps around the closed end to substantially surround an outer surface of the bag and the ring member so that waste is prevented from contacting the ring and the outer surface of the bag during waste collection.

18. The tool of claim 17, wherein the clamps are attached to the elongated shaft member adjacent to its first end and on opposite sides of the elongated shaft member.

19. The tool of claim 17, wherein the clamps are alligator clips.

20. The tool of claim 17, wherein the elongated shaft member is comprised of two detachably connected sections.

21. The tool of claim 17, further comprising a handle member attached on the second end of the elongated shaft member.

22. The tool of claim 21, wherein the handle member has a substantially rectangular cross-section and is attached to the elongated shaft member, which also has a substantially rectangular cross-section, such that the handle member is rotationally offset with respect to the elongated shaft member.

* * * * *